United States Patent [19]
Degioia et al.

[11] 3,788,714
[45] Jan. 29, 1974

[54] BALL BEARING WITH A UNITARY SEPARATOR-SEAL

[75] Inventors: Peter A. Degioia, Sandusky; Charles B. Sutton, Port Clinton, both of Ohio

[73] Assignee: General Motors Corporation, Detroit, Mich.

[22] Filed: June 15, 1972

[21] Appl. No.: 263,109

[52] U.S. Cl. ............................ 308/187.2, 308/201
[51] Int. Cl. ...................... F16c 33/78, F16c 33/46
[58] Field of Search ................ 308/201, 217, 187.2

[56] References Cited
UNITED STATES PATENTS
3,113,812   12/1963   Dotter .............................. 308/201

FOREIGN PATENTS OR APPLICATIONS
1,104,870   6/1955   France .............................. 308/201

Primary Examiner—Al Lawrence Smith
Assistant Examiner—Frank Susko
Attorney, Agent, or Firm—F. J. Fodale

[57] ABSTRACT

A ball bearing is completely sealed by a pair of independent unitary separator-seals. Each of the separator-seals closes one side of the annular space between the bearing races and includes a tubular separator with ball pockets which snap receive the bearing balls. Each separator-seal has a rigid sealing lip which centers its respective separator-seal from one bearing race and a second thin and relatively flexible sealing lip wipingly engaging the opposite bearing race to seal one side of the bearing.

2 Claims, 5 Drawing Figures

PATENTED JAN 29 1974 3,788,714

BALL BEARING WITH A UNITARY SEPARATOR-SEAL

This invention relates generally to antifriction bearings and more specifically to an antifriction bearing having a separator for circumferentially spacing the antifriction elements of the bearing and seals for one or both ends of the annular space between the bearing rings combined in same fashion.

Separator-seal combinations are already known from U.S. Pat. No. 3,554,621, to McAllister the U.S. Patent to Dotter U.S. Pat. No. 3,113,812, the French Patent to Mazzoni 1,104,870 and the British Patent to Super Oil Seals and Gaskets, Ltd. 615,107.

In the separator-seal combinations disclosed in the U.S. patents and the French patent, however, the separators disposed between the races extend across the pitch circle of the antifriction elements and in most cases have a thickness which is greater than half the distance between races with the result that the bearing cannot be completely sealed satisfactorily. For instance, one completely sealed bearing disclosed uses a unitary separator-seal for sealing one end of the bearing and a conventional seal at the other end of the bearing which limits the speed capability of the bearing to that of the conventional seal thereby obviating the higher speed capability of the unitary separator-seal used to seal the other end of the bearing.

Another completely sealed bearing uses two separator-seal elements and requires some means of fastening the two elements together in the bearing. This scheme requires close tolerance control of the individual elements, matching of individual elements and precise fastening of the individual elements to avoid adverse effects on the sealing efficiency. This scheme is costly, complicated and therfore unsatisfactory.

In another completely sealed bearing, a double row of antifriction elements is used, however, this does not provide a solution for the majority of bearings which have only a single row of antifriction elements.

In the separator-seal combination disclosed in the British patent, only one end of the bearing is sealed by a unitary separator-seal which occupies almost the entire annular space between the bearing rings so that no manner of providing a completely sealed bearing is readily apparent.

The object of our invention is to provide an antifriction bearing having a separator-seal combination which generally improves upon those already known and permits a completely sealed single row bearing when desired without the attendant disadvantage of those already known.

We have generally accomplished the object of our invention by incorporating a rigid sealing lip into a unitary separator-seal which radially locates the unitary separator-seal on one of the bearing rings and by reducing the thickness of separator portion with the result that an antifriction bearing can be completely sealed with two similar independent unitary separator-seals.

Other objects and features of our invention will become apparent in conjunction with the following disclosure and drawings wherein.

Figure 1:
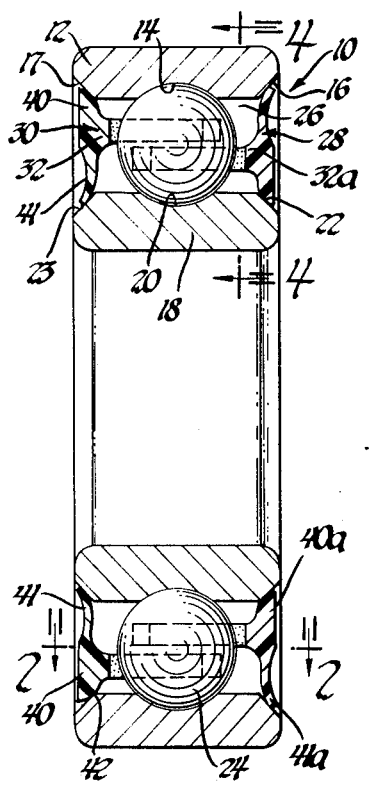
FIG. 1 is a section taken through the axis of an antifriction bearing having a pair of independent unitary separator-seals to completely seal the annular space between the bearing races.

Referring now to the drawings and more specifically to FIG. 1, the single roll ball bearing 10 has an outer race 12 with an uninterrupted deep groove raceway 14. The ends of the shoulders adjacent the raceway 14 are chamfered into outwardly sloping lands 16 and 17. Similarly, the inner race 18 has a deep groove uninterrupted raceway 20 and chamfered ends on its shoulders which provide inwardly sloping lands 22 and 23. The races 12 and 18 are relatively rotatable and spaced by a plurality of balls 24 disposed in the confronting raceways 14 and 20. The right side of the annular space 26 between the races is closed by a unitary separator-seal indicated at 28 and the left side of the annular space 26 is closed by a second independent unitary separator-seal indicated at 30 to provide a completely sealed single roll ball bearing.

Figure 5:
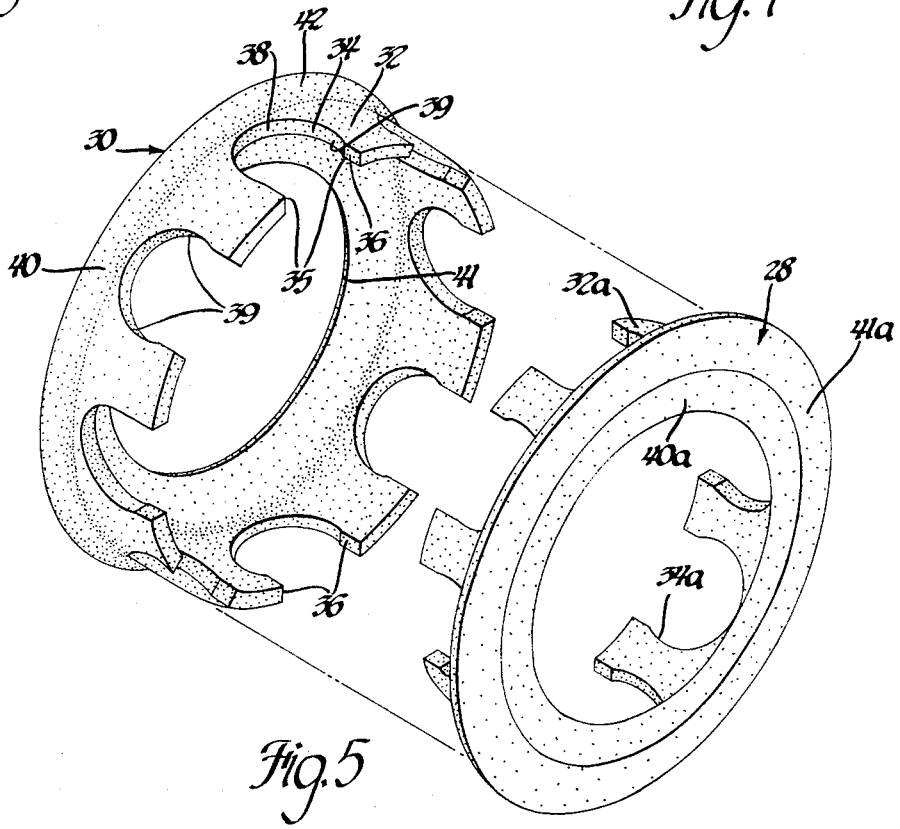
FIG. 5 is a perspective of the two separator-seal elements shown in FIG. 1.

Referring now to FIG. 5, the unitary separator-seal 30 comprises a tubular body 32 having a plurality of ball receiving pockets 34. The pockets 34 are preferably particylindrical and of uniform diameter to facilitate molding of the unitary separator-seal from a suitable plastic material such as an acetal homopolymer. The ball pockets 34 are greater than 180° and accessible from one end through openings 35 defined by pairs of spaced flat parallel walls 36 contiguous with the ends of the cylindrical walls 38 defining the pockets 34. The width of the openings 35 is such that the balls 24 may be snap received in the pockets 34 and retained therein by the arcuate portions 39 of the cylindrical walls 38 adjacent the openings 35.

The opposite end of the tubular body 32 has two annular generally radial lips 40 and 41. The outwardly extending lip 40 is relatively thick and rigid and has a sloping arcuate sealing face 42 on its interior side. The inwardly extending lip 41 tapers from the exterior end of the tubular body 32 and is relatively thin and flexible.

The unitary separator-seal 30 is assembled to the bearing 10 by a simple axial insertion into the annular space 26 between the races 12 and 18 from the left side of the bearing 10 until the balls 24 are snap received in the pockets 34. In the assembled position shown in FIGS. 1 and 2, the arcuate portions 39 defining the ball pocket 34 engage the balls 24 and draw the arcuate face 42 on the rigid annular lip 40 into intimate contact with the sloping land 17 on the left-hand side of the bearing outer race 12. The intimate contact at the interface of the land 17 and the rigid annular lip 40 provides a good seal and the lip 40 being rigid centers the unitary separator-seal 30 on the outer race 12. While it is understood that no material is absolutely rigid, the lip 40 is sufficiently rigid so that it forms a good seal with the land 16 through intimate contact therewith without depending to a great extent on the resiliency of the material although there could be some slight deflection of the lip 40 incident to the balls 24 drawing it into intimate contact with the land 17. Because the unitary separator-seal 30 is centered from the outer race 12, the balls 24 need not perform this function through the ball pockets 34 and thus the tubular body 32 is relatively thin compared to the annular space 26.

In the construction illustrated in FIG. 1, the thickness of the tubular body 32 is approximately a fourth of the height of the annular space 26 which is ample to give the desired strength to the tubular body 32 and yet provide sufficient room for the second unitary separator-seal 28.

Figure 4:
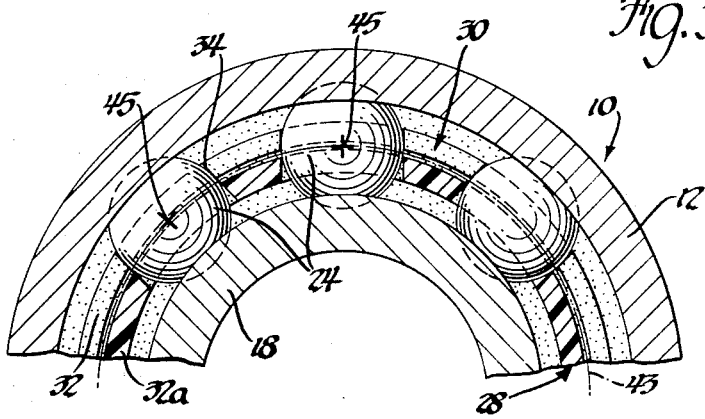
FIG. 4 is a section taken substantially along the line 4—4 of FIG. 1.

The tubular body 32 is preferably located just outwardly of the pitch circle 43 of the bearing defined by the centers 45 of the balls 24 since it is desireable to provide contact between the body 32 and the balls 24 as close to the pitch circle as possible which would be the case at the inner diameter of the body 32. See FIG. 4. Moreover, so locating the body 32 with respect to the rigid lip 40 enhances the rigidity of the lip while at the same time provides sufficient space to incorporate the flexible lip 41 which seals against the land 22 on the left side of the inner race 18 by being resiliently flexed into a lightly loaded wiping engagement with the land 23. A flexible type sealing lip opposite the rigid lip is preferable because it has a greater ability to adjust to the position of the unitary separator-seal 30 as determined by the rigid lip 40.

Figure 2:
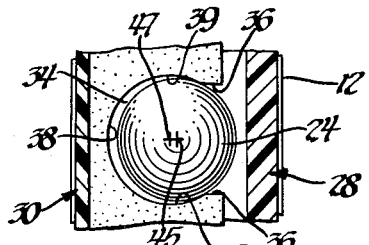
FIG. 2 is a section taken substantially along the line 2—2 of FIG. 1.
Figure 3:
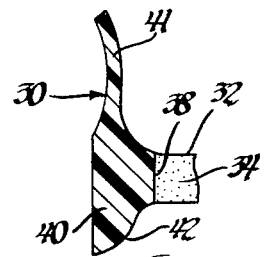
FIG. 3 is an enlargement of a portion of FIG. 1.

Another feature of this invention is that the ball pockets 34 which need only be particylindrical in the first instance are preferably oversize with centers 47 offset from the centers 45 of the balls 24 toward the lip end of the tubular body 32 thereby insuring that the balls 24 contact the portions 39 to draw the rigid lip 40 into intimate contact with the land 17. This relationship between the balls 24 and the pockets 34 is illustrated in FIG. 2.

The right side of the bearing 10 is sealed by the independent separator-seal 28. The unitary separator-seal is similar to the separator-seal 30 being somewhat of an inside-out version thereof, that is, the tubular body 32a is located inwardly of the pitch circle 43, the rigid lip 40a is inward and centers the separator-seal 28 from the inner race 18 and the flexible lip 41a is outward and wipingly engages the outer race 12. The ball pockets 34a, however, are identical to the ball pockets 34 so that the unitary separator-seal 28 is easily molded, is snap insertable into the bearing 10 from the right side thereof and provides an intimate sealing and centering contact of the rigid lip 40a with the land 22 on the right side of the bearing race 18 through cooperation with the balls 24.

Since the separator-seals 28 and 30 are independent, the sealing efficiency of the bearing is not dependent on matching or precise connection between the separator-seals and allows a greater tolerance range on the individual separator-seals. Moreover, the separator-seals being inside-out versions of each other permits contact with the balls 24 near the pitch circle and allows use of a flexible seal as the second sealing lip in each separator-seal which accommodates independent adjustment of each separator-seal on the bearing for improved sealing efficiency.

We wish it to be understood that we do not desire to be limited to the exact details of construction shown and described, for obvious modifications will occur to a person skilled in the art.

We claim:
1. An antifriction bearing comprising
a pair of relatively rotatable races coaxially disposed with an annular space therebetween, said races having uninterrupted deep groove raceways confronting each other with one of said races having a sloping land adjacent one end of said bearing,
a plurality of balls disposed in said raceways with their centers defining an imaginary pitch circle lying in said annular space, and
a unitary separator-seal for circumferentially spacing said balls and closing said annular space at said one end, said unitary separator-seal having
a tubular body axially disposed in said annular space on one side of said imaginary pitch circle, said tubular body having particylindrical pockets of uniform diameter communicating with axial openings extending to one end thereof through which said balls are snap received in said pockets, said pockets having arcuate portions adjacent said openings which wrap around said balls and retain them therein,
a rigid sealing lip and a flexible sealing lip extending generally radially in opposite directions from the other end of said tubular body, said pockets of uniform diameter having centers offset from the centers of said balls and said arcuate portions engaging said balls and drawing said rigid sealing lip toward said balls into intimate contact with said sloping land centering said unitary separator-seal on said one race and providing a seal therebetween and said resilient sealing lip being resiliently deformed into a lightly biased wiping engagement with said other race.

2. An antifriction bearing comprising
inner and outer relatively rotatable races coaxially disposed with an annular space therebetween, said races having uninterrupted deep groove raceways confronting each other, said inner race having an inwardly sloping land adjacent one end of said bearing, said outer race having an outwardly sloping land adjacent the other end of said bearing,
a plurality of balls disposed in said raceways with their centers defining an imaginary pitch circle lying in said annular space, and
a first unitary separator-seal circumferentially spacing said balls and closing said annular space at said one end, said first unitary separator-seal having
a tubular body axially disposed in said annular space, said tubular body having particular pockets at one end thereof defining openings through which said balls are snap received and retained in said pockets and arcuate portions adjacent said openings which wrap around said balls,
a rigid annular sealing lip and a flexible annular sealing lip extending generally radially in opposite directions from the other end of said first tubular body, said arcuate portions engaging said balls and drawing said rigid annular sealing lip toward said balls into intimate contact with said inwardly sloping land centering said first unitary separator-seal on said inner race and providing a seal therebetween and said resilient sealing lip being resiliently deformed into a lightly biased wiping engagement with said outer race,
a second unitary separator-seal circumferentially spacing said balls and closing said annular space at said other end, said second unitary separator seal having a tubular body portion axially disposed in said annular space, said tubular body portion having particircular pockets at one end thereof defining openings through which said balls are snap received and retained in said pockets and arcuate portions adjacent said openings which wrap around said balls, a rigid annular sealing lip and a flexible annular sealing lip extending generally radially in opposite directions from the other end of said second tubular body, said arucate portions engaging said balls and drawing said rigid annular sealing lip toward said balls into intimate contact with said outwardly sloping land centering said unitary separator-seal on said outer race and providing a seal therebetween and said resilient sealing lip being resiliently deformed into a lightly biased wiping engagement with said inner race.

* * * * *

PO-1050
(5/69)

UNITED STATES PATENT OFFICE
CERTIFICATE OF CORRECTION

Patent No. 3,788,714      Dated January 29, 1974

Inventor(s) Peter A. Degioia, Charles B. Sutton

It is certified that error appears in the above-identified patent and that said Letters Patent are hereby corrected as shown below:

In the Claims:

Claim 2, col. 4, line 45, after "having", "particular" should read -- particircular --.

Signed and sealed this 4th day of June 1974.

(SEAL)
Attest:

EDWARD M. FLETCHER, JR.
Attesting Officer

C. MARSHALL DANN
Commissioner of Patents